Patented Sept. 26, 1939

2,174,507

UNITED STATES PATENT OFFICE 2,174,507

REACTION OF LIQUID N-ALKANES WITH SULPHUR DIOXIDE AND CHLORINE AND PRODUCTS THEREOF

John M. Tinker, Penns Grove, and Arthur L. Fox, Woodstown, N. J., assignors to E. I. du Pont de Nemours & Company, Wilmington, Del., a corporation of Delaware No Drawing. Application June 30, 1938, Serial No. 216,839

16 Claims. (Cl. 260—513)

This invention relates to the preparation of alkyl sulphonyl chlorides and chlor alkyl sulphonyl chlorides and derivatives thereof. More particularly, it relates to a process of reacting saturated normal alkane hydrocarbons by reacting them with a mixture of sulphur dioxide and chlorine, the former being in excess. Still more particularly it relates to a process of reacting normally liquid n-alkane hydrocarbons of 5 to 12 carbon atoms by reacting them with a gaseous mixture of sulphur dioxide and chlorine, preferably preformed, the former being in excess.

This invention has for an object the preparation of alkyl sulphonyl chlorides. A further object is the preparation of mixtures of alkyl sulphonyl chlorides and chlor alkyl sulphonyl chlorides. A still further object is the preparation of alkyl mono-sulphonyl chlorides. A still further object is the preparation of surface agents and compositions from alkyl sulphonyl chlorides. Other objects will appear hereinafter.

The above and other objects are accomplished by the following invention which comprises reacting a normal alkane hydrocarbon with a mixture of sulphur dioxide and chlorine, the former being in excess at temperatures below 150° C. preferably below 100° C. In a preferred embodiment, they are accomplished by reacting an normal alkane hydrocarbon having from 5 to 12 carbon atoms with a gaseous mixture of sulphur dioxide and chlorine, the former being in excess at a temperature between 30° and 80° C.

Gaseous sulphur dioxide and chlorine are mixed in such amounts that there is an excess of the former and passed into a reaction zone containing the hydrocarbon. In the preferred embodiment the hydrocarbon is in the liquid state and the gaseous mixture is bubbled through the same. The reaction zone is well illuminated with natural and/or artificial light. Catalysts may be used alone but preferably in conjunction with actinic light. The gaseous mixture should be thoroughly distributed throughout the reaction zone or mixture by a suitable device such as a porous diaphragm or a gas distributing stirrer. The two gases may be separately led into the vessel and then mixed.

Soon after the introduction of the gases begins, the solution in some instances takes on a slight yellow-green color characteristic of chlorine, and the temperature begins to rise. When the flow of gases is very fast, external cooling of the reaction mixture may be availed of. Vaporized alkanes may be returned to the reaction vessel by a reflux condenser, and it may be desirable to pass the exit gases through a trap maintained at about —5° C. Any alkane which passes through the reflux condenser may be condensed by this trap and can be returned to the reaction mixture.

When a sufficient amount of the gases has been introduced, that is when at least one sulphonyl chloride group has been introduced into the molecule, the reaction is stopped. Useful products may be recovered from the reaction mixture or the latter may be used for the preparation of derivatives. The reaction mixture is preferably blown with an inert gas such as nitrogen, carbon dioxide or sulphur dioxide in order that the reaction product will not darken upon standing.

From the above treatment, one obtains alkyl sulphonyl chlorides which are in admixture with chlor alkyl sulphonyl chlorides and alkyl chlorides. The alkyl sulphonyl chlorides and chlor alkyl sulphonyl chlorides may be hydrolyzed by treatment with water or a basic agent, to yield water-soluble sulphonic acids or their salts. There is also present after this hydrolysis certain quantities of unreacted material or chlorinated material which contains no sulphonyl chloride group. This may be separated by treatment of the hydrolysate with alcohol or dilution with water followed by warming. The aqueous solution of alkyl sulphonic acid salts thus produced have been found to be especially valuable as mercerizing assistants and for other purposes in which surface tension phenomena are involved which will be described below.

The invention will be further illustrated but is not intended to be limited by the following examples in which the parts stated are parts by weight:

Example I

Five hundred grams of normal pentane were treated with a gaseous mixture of sulphur dioxide and chlorine for 4 hours. The ratio in the gaseous mixture was 2 weights sulphur dioxide per weight of chlorine. The reaction vessel was fitted with condensers containing glycol at 0°, but even with this precaution considerable pentane was carried off, with the exit gases. The net gain in weight exclusive of the material lost by evaporation was 108 g. The reaction product was aerated with dry air for 20 minutes and lost 22 g. in weight. Analysis: S 16%, Cl 27.5%. This analysis corresponds to .9 sulphur and 1.35 chlorine atoms per hydrocarbon.

Four hundred grams of the above pentane sulphonyl chlorides was treated slowly with 430 cc. 10 normal sodium hydroxide. The reaction was very vigorous. This amount of caustic was sufficient to give a permanent alkalinity but the hydrolysate was diluted to 2 liters using 500 cc. alcohol and the rest water. The oil separating was drawn off and weighed 27 g. The aqueous layer was evaporated to dryness on a steam bath and the solid crystals containing water of crystallization weighed 570 g. This material is efficacious as a printing assistant for vat colors.

Example II

A mixture of sulphur dioxide and chlorine was passed into 200 grams of normal hexane for three hours. The reaction vessel was equipped with a condenser cooled with carbon ice and acetone, but nevertheless considerable hexane was evaporated and the total weight of the crude product after three hours was only 389 g. Analysis of the crude product, chlorine 25.42%, sulphur 15.07%.

Example III

Eight hundred grams of n-hexane was treated with sulphur dioxide and chlorine in a graduate equipped with condensers cooled with acetone refrigerated with carbon ice. The sulphur dioxide and chlorine were passed in for 15 hours. The gain in weight was 920 g. and the total sulphur dioxide consumed was 2436 g. and chlorine was 1436 g. In this run the temperature of the reaction mass remained at 20-30° due to the sulphur dioxide condensing in these reflux condensers and dropping back into the charge. At the end of the run the charge was blown and lost 380 g. due, of course, to the fact that considerable liquid $SO_2$ was thus evaporated. The total net gain in weight was 540 g. This product contains a very strong tear gas. The crude material was placed under vacuum on a water bath at 50° and lost 31% in weight. The distillate from this evaporation was condensed and gave on analysis sulphur 12.89%, chlorine 29.6%. The residue from this vacuum heat treatment analyzed sulphur 16.52% and chlorine 26.15%. This corresponds to 1.1 sulphur and 1.56 chlorine atoms per molecule of hydrocarbon. 300 g. of the above hexane sulphonyl chlorides and chlorhexane sulphonyl chlorides was treated slowly with 318 cc. of 10 normal sodium hydroxide which produced a permanent alkalinity. This treatment caused the reaction mass to rise to the boil and it was stirred 15 minutes after the last of the alkali was introduced in order to insure permanent alkalinity. This was diluted with 1 liter of water and the oil which separated weighed 21 g. Analysis of the oil, sulphur 3.18%, chlorine 47.78%. The aqueous portion from which the oil was separated was evaporated to dryness and weighed 333 g. This product was of especial value as a mercerizing assistant and showed good properties as a printing assistant for vat colors.

Example IV

Fifteen hundred grams of normal heptane were treated with sulphur dioxide and chlorine until the gain in weight was 1270 g. There was used in this operation 2685 g. sulphur dioxide and 1752 g. chlorine. The product was blown with nitrogen overnight and was then heated at 70° under vacuum for three hours. The loss in weight due to these two operations was 508 g. Analysis of residue Cl 27.2%, S 13.7%. This corresponds to .93 sulphur and 1.66 chlorine atoms per molecule. 200 g. of the above heptane sulphonyl chlorides and chlor-heptane sulphonyl chlorides was hydrolyzed with 150 cc. 10 normal sodium hydroxide. The material was steam distilled and 30 g. of an oil was collected. This oil contained 36% chlorine and .17% sulphur. The aqueous solution of heptane sulphonic acid salts was very excellent as a mercerizing assistant.

Example V

Eight hundred grams of n-octane were treated with sulphur dioxide and chlorine for 16 hours, under the influence of light, the gain in weight being 943 g. This was blown with nitrogen and lost 13 g. The analysis of the crude product was sulphur 15.1%, chlorine 28.35%. This corresponds to a ratio of 1.3 sulphur and 2.2 chlorine atoms per molecule of hydrocarbon. 200 g. of the above octane sulphonyl chlorides and chlor-octane sulphonyl chlorides was hydrolyzed with 10 normal sodium hydroxide taking 208 cc. before permanent alkalinity was achieved. There was an oil separated which was drawn off and contained 2.9% sulphur and 37.84% chlorine. The aqueous layer was steam distilled to remove further small amounts of oil. The aqueous solution of octane sulphonic acid salts was of definite value as a mercerizing assistant.

Example VI

Eight hundred grams of n-nonane were treated with a mixture of sulphur dioxide and chlorine for 15 hours using the total of 3028 g. sulphur dioxide and 1084 g. chlorine. The gain in weight was 890 g., but a loss of 67 g. was sustained on blowing the reaction mass gently with nitrogen overnight. The analysis of the product, chlorine 24.49%, sulphur 14.18%. This corresponds to 1.2 sulphur and 1.94 chlorine atoms per molecule of nonane. 200 g. of the above product was hydrolyzed using 173 cc. 10 normal sodium hydroxide to give permanent alkalinity. 18 g. of salt was filtered off and the filtrate diluted to one liter and distilled. 14 g. of oil came over and was discarded. The residue from the steam distillation comprising the sodium salts of nonane sulphonic acids and chlor nonane sulphonic acids was an excellent mercerizing assistant.

Example VII

Eight hundred grams of n-decane were treated with a mixture of sulphur dioxide and chlorine for 16 hours. Under the influence of light the maximum temperature of the reaction was 70°. The gain in weight was 777 g. but 40 g. was lost aerating. Analysis: chlorine 22.95%, sulphur 12.92%. This analysis indicated 1.1 sulphur and 1.76 chlorine atoms per molecule. 300 g. of the above mixture of decane sulphonyl chlorides and chlor decane sulphonyl chlorides were hydrolyzed with 203 cc. 10 normal sodium hydroxide. The hydrolysate was stirred at 100° for 15 minutes after the caustic was added and remained permanently alkaline. It was then diluted to 1100 g. with water and separated from an oil which weighed 45 g. The oil contained 26.06% chlorine, 1.04% sulphur. The aqueous layer from which the oil was separated was evaporated to 700 g. and was shown to be an excellent mercerizing assistant as well as a detergent under acid conditions.

Example VIII

Three hundred grams of n-dodecane were treated with a mixture of $SO_2$ and chlorine under the influence of light at 45–50° for 3.25 hours. A total of 593 g. $SO_2$ and 237 g. $Cl_2$ were used and the net gain in weight of the product was 195 g. This product was not analyzed but was hydrolyzed directly to the sulphonic acid by mixing with 497 g. 30% NaOH, diluting with water and extracting with carbon tetrachloride.

It is to be understood that the invention is not to be limited to the specific modes of operation set forth above. The proportions of sulphur dioxide to chlorine may vary from 1 to 20 mol of the former to one of the latter, 2 to 6 mols represent a practical range and 2.5-3.5 represent a preferred range of the sulphur dioxide. The temperature may likewise vary over a fairly wide range, for instance, temperatures from 0° C. up to the decomposition point of the formed sulphonyl chlorides may be used. Temperatures from 20° to 150° C. represent a practical range and exceptionally good results are obtained between 30° and 80° C.

While the apparatus described in the examples was chosen primarily because it was easily adapted for use in the laboratory, it is obvious that other types may be used particularly when it is to be carried out upon a commercial scale. Any of the non-corrodible materials used for chemical apparatus may be employed, enamel, nickel and nickel alloys being especially suitable. Means for distributing the gases may include porous diaphragms, perforated coils, plates or similar devices which may be used alone or in conjunction with suitable agitators.

Instead of a closed vessel provided with a reflux condenser, one may use a long narrow tube. The tube may be partially filled with liquid n-alkanes and chlorine and sulphur dioxide may be bubbled into the bottom thereof. A counter current process in which the n-alkane flowing in one direction through a tube is caused to react with a gaseous chlorine and sulphur dioxide mixture flowing in the opposite direction, as described and claimed in an application for Letters Patent of Wm. H. Lockwood and J. L. Richmond, Serial Number 216,843 entitled "Continuous process" filed upon an even date herewith, may be resorted to. The reaction tubes can be packed with any device suitable for carrying out the reaction of a liquid with a gas, e. g., Raschig rings, broken glass, etc.

Various changes in the reaction conditions can be made. The reaction can be run under the influence of light, either the ordinary light of the room, in bright sunlight, under powerful incandescent or arc lamps, or under strong ultraviolet or infra-red radiation. Thus clear or frosted electric light bulbs, carbon arcs including metal cored and metal salt cored carbon arcs and rare gas lamps may be used. Catalysts may be used alone or in conjunction therewith. The pressure can be varied from atmospheric pressure up to any desired pressure at which the chlorine and sulphur dioxide mixture remain gaseous at the reaction temperature.

The reaction zone may be maintained at atmospheric pressure or below, but is preferably carried out at atmospheric pressure or any pressure above, so long as the chlorine and sulphur dioxide remain gaseous at the reaction temperature.

This invention is not to be limited to the hydrolysis procedure set forth in the examples. For instance, the concentration of caustic soda used for hydrolyzing the reaction product obtained by treating n-alkane with a gaseous mixture of sulphur dioxide and chloride may be varied from 5% to 50%. The reaction is somewhat slower with the more dilute caustic soda solutions and almost instantaneous with the more concentrated solutions. Other alkali metal hydroxides such as potassium, calcium, etc., may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethylcyclohexylamine, pyridine, aniline, toluidine, xylidines, $\beta$-naphthylamine, etc. Thus, the amine salts of chloro-n-alkane-methanesulphonic acids may be obtained. Also, the strong quarternary ammonium bases such as tetramethylammonium hydroxide and tetraethylammonium hydroxide may be used for the hydrolysis. The resulting products would be the tetramethylammonium salt or the tetraethylammonium salt of chloro-n-alkane-sulphonic acid. The preferred salt for use in mercerizing liquors is, of course, the sodium salt. For use in acid or salt solutions one of the amine or quaternary ammonium salts may be more desirable as possessing greater solubility.

Water-miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol, and its ethers and esters, e. g. the dimethyl and diethyl ethers of ethylene glycol.

The final product can be worked up in a number of ways. It can be left as a solution containing insoluble oil or a solution from which the insoluble oil has been removed. The product can be spray- or drum-dried and applied as such, or standardized with some innocuous diluent. If a particularly pure product is desired, the drum dried product can be extracted with hot alcohol and the alcoholic extract evaporated to give a pure 100% product free of inorganic salts. Further, unreacted oil can be removed by diluting the saponified solution and separating. The oil can be extracted by means of a water immiscible solvent or it can be removed by steam distillation.

The products prepared according to this invention serve as intermediates for the preparation of numerous derivatives such as, for example, alkane sulphonic acids, sulphinic acids, amides, sulphonyl esters, mercaptans, etc. which may be useful as mercerizing assistants, plasticizers for paints, nitro cellulose lacquers, varnishes, Cellophane, etc., corrosion inhibitors, gum solvents for gasoline, extractants for the refining of oils and gasoline, pour point depressants, insecticides, fly spray ingredients, weed killers, soil fumigants, cotton immunization chemicals, anti-shrinking agents for wool, foaming agents, mold inhibitors, crease-proofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing pastes, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, cleansing compositions as household detergent compositions, shampoos, dentifrices, washing of paper mill felts, etc. They may also be used to improve fat liquoring and leather treatment processes as well as for fat splitting agents. They may be useful in improving the preservation of green fodder. They may also be useful in improving the removal of fibrous layers from surfaces and in metal cleaning. They may also be used to improve flotation processes of ores, pigments, coal, etc. They may be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may be useful in storage batteries and dry cells. Other uses for these products or their derivatives are as fungicides, accelerators, delusterants, extreme pressure lubricants, moth proofing agents, antiseptics, fire-proofing agents, mildew preventers, penetrating agents, anti-flexing agents, tanning agent, lathering agent, dust collecting agents, anti-oxidant, color stabilizer in gasoline, etc.

The surface activity of some of the agents may be enhanced by electrolytes or by the addition of other surface-active agents, e. g., alkylated naphthalene sulphonic acids and their water-soluble salts, salts of higher alkyl sulphuric acid esters as described in Bertsch Patents Nos. 1,968,794 to 1,968,797, long chain betaine derivatives both of the C- and N- and open type which are illustrated by Daimler et al. Patent No. 2,082,275, Balle et al. Patent 2,087,565, Platz et al. Patent 2,097,864 and Balle et al. Patent 2,101,524, long chain ammonium, sulphonium and phosphonium compounds, as well as numerous other soap substitutes.

The hydrolysis products or water-soluble sulphonic acid salts derived from the above-described sulphonyl chlorides may be used as aforesaid in admixture with one another and/or in admixture with soap and/or soap substitutes of the prior art, for the various purposes wherein soap and/or soap substitutes have previously been used or are capable of use. A few representative uses are set forth in Reed application, Serial No. 216,332, entitled "Chemistry" filed upon an even date herewith, and it is to be understood that the products produced according to this invention may be substituted in like amount for the products of each of the examples of that case.

As many apparently widely different embodiments of this invention may be made without departing from the spirit and scope thereof, it is to be understood that we do not limit ourselves to the specific embodiments hereof except as defined in the appended claims.

We claim:

1. A process which comprises reacting a liquid n-alkane having from 5 to 12 carbon atoms with admixed gaseous sulphur dioxide and gaseous chlorine at a temperature below the decomposition point of the formed hydrocarbon sulphonyl chlorides.

2. A process which comprises reacting a liquid mixture essentially composed of n-alkanes having from 5 to 12 carbon atoms with a gaseous mixture of sulphur dioxide and chlorine, the former being in excess, at a temperature below the decomposition point of the formed hydrocarbon sulphonyl chlorides.

3. A process which comprises reacting a normally liquid n-alkane in the liquid state with a gaseous mixture of sulphur dioxide and chlorine, the former being in excess.

4. A process which comprises reacting an n-alkane containing from 5 to 12 carbon atoms in the liquid phase with a gaseous mixture containing from 1.5 to 6 mols of sulphur dioxide to 1 of chlorine at a temperature between 20° and 110° C.

5. A process which comprises reacting an n-alkane containing from 5 to 12 carbon atoms in the liquid phase with a gaseous mixture containing from 1.5 to 6 mols of sulphur dioxide to 1 of chlorine at a temperature between 30° and 80° C. in the presence of actinic light.

6. A process which comprises reacting a mixture of n-alkanes containing from 5 to 12 carbon atoms in the liquid phase with a gaseous mixture containing from 1.5 to 6 mols of sulphur dioxide to 1 of chlorine at a temperature between 30° and 80° C. in the presence of actinic light.

7. A process which comprises reacting an n-alkane containing from 5 to 12 carbon atoms in the liquid phase with a gaseous mixture containing from 1.5 to 6 mols of sulphur dioxide to 1 of chlorine at a temperature between 30° and 80° C. in the presence of actinic light, removing the gaseous products from the reaction mixture and hydrolyzing the resulting product.

8. A process which comprises reacting a mixture of n-alkanes containing from 5 to 12 carbon atoms in the liquid phase with a gaseous mixture containing from 1.5 to 6 mols of sulphur dioxide to 1 of chlorine at a temperature between 30° and 80° C. in the presence of actinic light, removing the gaseous products from the reaction mixture and hydrolyzing the resulting product.

9. A process as set forth in claim 7 wherein a basic solution is used as the hydrolyzing agent.

10. The mixture of hydrocarbon sulphonyl chlorides produced by the process of claim 3.

11. The products produced by the process of claim 7.

12. A mixture of primary and secondary alkyl sulphonyl chlorides having from 5 to 12 carbon atoms in which the hydrocarbon radicals are straight chains and which predominate in the latter.

13. A mixture essentially composed of primary and secondary alkane and chloroalkane sulphonyl chlorides having from 8 to 12 carbon atoms in which the alkane groups are straight chains.

14. An alkali metal hydroxide solution essentially containing the hydrolyzed and neutralized sulphonyl chloride mixture produced according to claim 3.

15. A process which comprises reacting an n-alkane containing from 5 to 12 carbon atoms with admixed sulphur dioxide and chlorine.

16. A process which comprises reacting an n-alkane containing from 5 to 12 carbon atoms with admixed sulphur dioxide and chlorine in the presence of ultra-violet light.

JOHN M. TINKER.
ARTHUR L. FOX.